(12) United States Patent
Kraft, Jr. et al.

(10) Patent No.: US 12,741,600 B2
(45) Date of Patent: Sep. 22, 2026

(54) AUTOMOBILE INTERIOR WITH ENHANCED ACOUSTICS AND THERMAL RESISTANCE AND METHODS FOR MAKING SAME

(71) Applicant: Mutex, LLC, Livonia, MI (US)

(72) Inventors: James P. Kraft, Jr., Milford, MI (US); Robert Bowden, II, Brighton, MI (US)

(73) Assignee: Mutex, LLC

( * ) Notice: Subject to any disclaimer, the term of this patent is extended or adjusted under 35 U.S.C. 154(b) by 406 days.

(21) Appl. No.: 18/359,236

(22) Filed: Jul. 26, 2023

(65) Prior Publication Data

US 2024/0034251 A1 Feb. 1, 2024

Related U.S. Application Data

(60) Provisional application No. 63/392,721, filed on Jul. 27, 2022.

(51) Int. Cl.
*B60R 13/08* (2006.01)

(52) U.S. Cl.
CPC ...... *B60R 13/0815* (2013.01); *B60R 13/0884* (2013.01)

(58) Field of Classification Search
CPC .. B60R 13/0815; B60R 13/0884; B60R 13/08
USPC .......................................................... 296/39.3
See application file for complete search history.

(56) References Cited

U.S. PATENT DOCUMENTS

| | | | | |
|---|---|---|---|---|
| 5,298,694 | A * | 3/1994 | Thompson | B60R 13/0815 181/290 |
| 2003/0116379 | A1 * | 6/2003 | Khambete | B32B 11/04 181/290 |
| 2006/0065474 | A1 * | 3/2006 | Niwa | B60R 13/0838 181/151 |
| 2020/0184942 | A1 * | 6/2020 | Hakuta | B32B 15/04 |
| 2021/0051385 | A1 * | 2/2021 | Honji | B60R 13/0815 |
| 2021/0270337 | A1 * | 9/2021 | Rudek | F16F 1/3737 |

OTHER PUBLICATIONS

FR2665996A1 with English translation; Portez et al.; Mar. 7, 1991 (Year: 2025).*

(Continued)

*Primary Examiner* — Roger L Pang
(74) *Attorney, Agent, or Firm* — Laura Marmulstein

(57) ABSTRACT

The disclosed technology includes an automobile interior with enhanced acoustics and thermal resistance. In one embodiment, the automobile interior includes a sound-absorbing material coupled to an interior automobile surface adjacent to an automobile speaker. The sound-absorbing material includes an absorptive surface and a backing. The absorptive surface faces towards the automobile speaker to absorb sound waves emitted from a rear side of the automobile speaker and the backing blocks the sound waves from escaping a speaker compartment into a main cabin of the automobile, thereby mitigating echo and back wave frequency cancellation in the automobile interior. In some embodiments, the acoustically enhanced automobile interior may further include a second acoustical material coupled to the interior automobile surface and positioned between the sound-absorbing material and the interior automobile surface.

17 Claims, 11 Drawing Sheets

(56) References Cited

OTHER PUBLICATIONS

DE20006192U1 with English translation; Muller; Sep. 13, 2001 (Year: 2025).*
Theoretical and Experimental Studies on Thermal Properties of Polyester Nonwoven Fibrous Material; https://pmc.ncbi.nlm.nih.gov/articles/PMC7345890/#sec3-materials-13-02882; Jun. 26, 2020 (Year: 2020).*
Polyethylene Foam Physical Data Sheet; https://www.foambymail.com/polyethylene-foam-sheet.html?srsltid=AfmBOopIT67eZHOXvPWb1XWKbLR9TCV54k6hfon4GMQtslgLC35Y1Rdd; Feb. 1, 2015 (Year: 2015).*
Lianying Liao et. al., Research on the technology of noise reduction in hybrid electric vehicle with composite materials, Advances in Mechanical Engineering, Feb. 21, 2017, vol. 10(3) 1-8, Sage, Jiangsu, China.
Sorina Stanciu et. al., Insulation Materials—Interior Applications, FCA US LLC, Organic Materials Engineering, Dept., Jun. 28, 2019, 1-9, US.
2023 04 BEV Comparison—Insulation Study, Benchmarking Study, Stellantis, Apr. 3, 2023.

* cited by examiner

AUTOMOBILE INTERIOR WITH ENHANCED ACOUSTICS AND THERMAL RESISTANCE AND METHODS FOR MAKING SAME

CROSS REFERENCE TO RELATED APPLICATIONS

The present application claims the benefit of priority to U.S. Provisional Patent Application No. 63/392,721, entitled "ACOUSTICALLY ENHANCED AUTOMOBILE INTERIOR AND METHODS FOR MAKING SAME," filed Jul. 27, 2022, the entirety of which is hereby incorporated by reference herein for all purposes.

TECHNICAL FIELD

The technology described herein relates generally to acoustic enhancement and improved thermal resistance of an automobile interior.

BACKGROUND

Automobiles often have poor interior sound quality due, at least in part, to sound waves reflecting off hard, non-permeable, and often uneven surfaces that are in proximity. Some of these sound wave reflections may result in frequency cancellations as they interfere with sound waves coming from automobile speakers. This frequency cancellation further contributes to poor sound quality inside of automobiles.

Further, automobiles (e.g., electric vehicles) can have poor thermal resistance where heat more readily flows through the automobile frame. Such poor thermal resistance results in inefficient energy use by the automobile (e.g., by the automobile's heating and cooling systems working harder to maintain a desired temperature).

The information included in this Background section of the specification, including any references cited herein and any description or discussion thereof, is included for technical reference purposes only and is not to be regarded subject matter by which the scope of the invention as defined in the claims is to be bound.

SUMMARY

The disclosed technology includes an acoustically enhanced automobile interior. Embodiments of the present disclosure may include an acoustically enhanced automobile interior including a sound-absorbing material coupled to an interior automobile surface adjacent to an automobile speaker. The sound-absorbing material may include an absorptive surface and a backing. The absorptive surface may face towards the automobile speaker to absorb sound waves emitted from a rear side of the automobile speaker and the backing may block the sound waves from entering into a main cabin of the automobile, thereby mitigating echo and back wave frequency cancellation in the automobile interior.

Additional examples or embodiments of the present disclosure may include an automobile interior with enhanced acoustics and thermal resistance including a sound-absorbing material coupled to an interior automobile surface. The sound-absorbing material may include an absorptive surface including a first material and a backing including a second material. The absorptive surface may face towards a rear side of an automobile speaker to mitigate echo and back wave frequency cancellation in the automobile interior. The sound-absorbing material may have an R-value greater than 3.4.

Other examples or embodiments of the present disclosure may include a method of enhancing acoustics in an automobile interior. The method may include removing a cover from a semi-rigid or rigid backing of a sound-absorbing material to expose an adhesive surface and coupling the adhesive surface to an interior automobile surface adjacent to a rear side of an automobile speaker. The absorptive surface of the sound-absorbing material may absorb sound waves emitted from the rear side of the automobile speaker and the backing may block the sound waves from transmitting into a main cabin of the automobile interior, thereby mitigating echo and back wave frequency cancellation in the automobile interior.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1A:
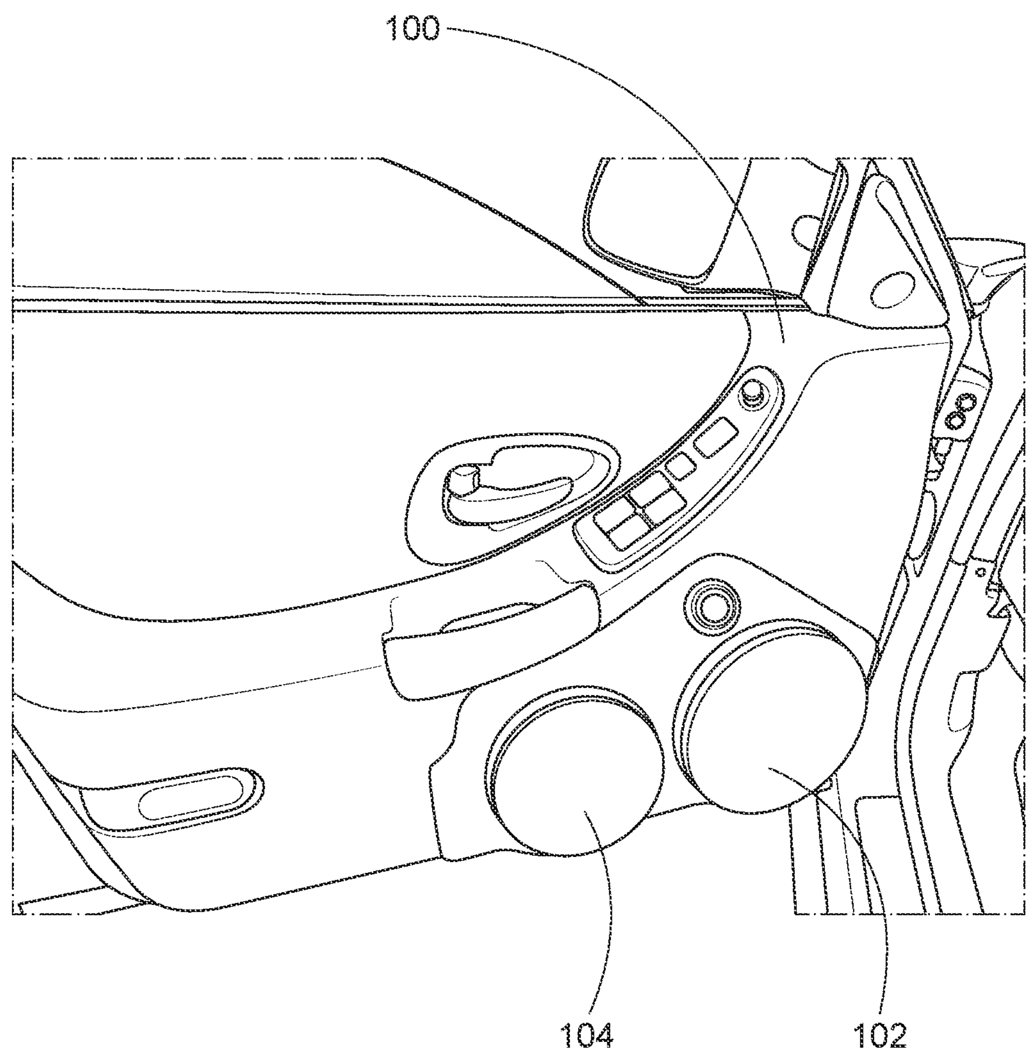
FIG. 1A is a front view of an automobile door with a first speaker and a second speaker.

This disclosure is related to methods and devices for improving acoustics and thermal resistance in the interior of an automobile, specifically by mitigating sound wave interference and providing improved insulation to the automobile interior. In several embodiments, one or more acoustical materials are coupled to one or more interior surfaces of an automobile. In some embodiments, a plurality of acoustical materials are coupled together and coupled to the one or more interior surfaces. For example, a first acoustical material may be coupled to a second acoustical material by adhesive. In some embodiments, a first acoustical material may be laminated or coated with one or more other acoustical materials. For example, a first acoustical material may be coupled to, or laminated or coated with, one or more of a second acoustical material, a third acoustical material, a fourth acoustical material, a fifth acoustical material, etc. The number of acoustical materials in addition to the first acoustical material may be varied based on desired acoustics and/or thermal resistance (e.g., R-value) inside the automobile.

In several embodiments, an acoustical material includes a sound-absorbing material. In several embodiments, the sound-absorbing material is positioned in an automobile door panel. In several embodiments, the sound-absorbing material is positioned in a speaker compartment, cabinet, or cavity. The sound-absorbing material may be further positioned on a majority of the automobile interior surfaces and panels to further improve acoustics and thermal resistance of the interior. The sound-absorbing material may be made of a non-woven polyester fabric with a polyethylene backing. In several embodiments, the sound-absorbing material is combined with at least one other acoustical material for enhanced acoustic effect and/or improved thermal resistance. The at least one other acoustical material may be a second sound-absorbing material and/or a damping material that controls resonant frequency of surfaces it is coupled to. The damping material may include butyl rubber and/or asphalt.

Destructive interference is the interference of two sound waves of equal frequency and opposite phase, which results in their cancellation. Such interference can occur when waves travel in opposite directions and collide. This phenomenon is often observed with speakers, where sound waves are emitted out both the front and back of the speaker. When the front waves and back waves reflect off surfaces, they can collide at a 180 degree orientation to one another and cancel each other out. Such interference or back wave cancellation or back wave frequency cancellation disrupts the sound coming from the speaker. In automobiles having small enclosures and nearby surfaces, this back wave cancellation can be common, negatively impacting sound quality inside of automobiles.

Current technology to improve sound quality inside an automobile is expensive and fails to effectively mitigate echo and back wave cancellation inside the automobile. For example, active noise cancellation technology is used in certain cars to cancel out unwanted sounds. Active noise cancellation technology works by emitting sound frequencies that cancel out certain external and internal noises (e.g., from the road, engine, tires, or wind). Such active noise cancellation technology often involves a microphone that detects sound, a processor that generates a signal based on the detected sound, and vehicle speaker(s) to emit the signal that cancels out the detected sound. In contrast, disclosed methods and devices may enable passive noise cancellation inside an automobile that provides at least the same improved sound quality inside the automobile as existing active noise cancellation technology, but without the added expense and electronics. The disclosed passive noise cancellation technology may effectively mitigate echo and back wave cancellation inside the automobile without the expensive electronics associated with current active noise cancellation technologies.

In several embodiments, disclosed passive noise cancellation methods and devices mitigate destructive interference and echo and back wave cancellation inside of automobiles, thereby improving sound quality inside of automobiles. In several embodiments, a disclosed sound-absorbing material is coupled to an automobile surface adjacent to a speaker. The disclosed sound-absorbing material may be coupled to a surface in a door panel, for example, in a speaker compartment or cavity. The disclosed sound-absorbing material may absorb sound waves emitted from a rear side of the speaker to prevent or mitigate echo and back wave cancellation. Some ineffective acoustical materials have been used inside automobiles, but these acoustical materials merely slow sound waves and do not effectively absorb them to mitigate echo and back wave cancellation. By mitigating echo and back wave cancellation, disclosed methods and devices may provide improved automobile interior acoustics that were not possible with the ineffective acoustical materials previously used. The disclosed sound-absorbing material may also block sound waves from escaping the automobile interior or from escaping a compartment or enclosure (e.g., a speaker compartment or enclosure) within the automobile interior (e.g., and entering a main cabin of the automobile interior), which may improve sound quality of the automobile speakers and allow for increased privacy inside the automobile.

In several embodiments, disclosed methods and devices also reduce noise and echo inside the automobile. In some embodiments, disclosed methods and devices also improve thermal resistance inside the automobile. In these embodiments, the disclosed sound-absorbing material may be placed on a plurality of internal surfaces of the automobile. The disclosed sound-absorbing material may be placed on a majority of the internal surfaces. For example, the sound-absorbing material may be placed on one or more of (or two or more of) the floor, ceiling or headliner, door panels, trunk surfaces, hood surfaces, dashboard, engine compartment, exhaust system components (e.g., as a tunnel protector), panel/pillar trim or panel/pillar (e.g., quarter panel, pillars A, B, C, or D), and the like. In several embodiments, the sound-absorbing material is placed on a majority of the surface it is coupled to (e.g., a majority of the floorboard or a majority of the door panel). For example, the sound-absorbing material may cover over 85% of the surface it is coupled to. As an example, the sound-absorbing material may cover 100% of the surface it is coupled to.

The disclosed sound-absorbing material may have an absorptive surface and a backing. The absorptive surface may include a first material and the backing may include a second material. In several embodiments, the absorptive surface faces towards an interior of the automobile or automobile compartment (e.g., speaker compartment). For example, the absorptive surface may face towards one or more sound sources in an interior of the automobile or automobile compartment. In several embodiments, the absorptive surface faces towards an automobile speaker. The absorptive surface may absorb sound waves of a certain frequency or frequency range. The absorptive surface may be made of a needle punch non-woven fabric. In some embodiments, the absorptive surface is made of polyester, such as, for example, non-woven polyester (e.g., needle punch non-woven polyester), or polyethylene terephthalate (PET). The backing may be coupled to an automobile surface. The backing may block sound waves or have sound-blocking properties. For example, the backing may prevent sound from escaping the automobile interior and entering an environment external to the vehicle and/or from escaping an enclosure within the automobile interior (e.g., a speaker compartment) and entering into a main cabin of the automobile (e.g., where a driver and passengers are seated). The backing may be made of a rigid or semi-rigid material. As an example, the backing may be made of polyethylene. In one embodiment, the sound-absorbing material is MuteX.

In several embodiments, the disclosed sound-absorbing material may also improve an automobile's thermal resistance. The disclosed sound-absorbing material may have a high R-value, i.e., a high resistance to conductive heat flow. For example, the sound-absorbing material may have an R-value between about 1.5 to about 6.0. As another example, the disclosed sound-absorbing material may have an R-value of 3.4 or higher (e.g., 3.46). The R-value of the sound-absorbing material may be modified by adding additional materials to the sound-absorbing material (e.g., via coupling or lamination). By restricting heat flow into and out of an automobile interior, the disclosed sound-absorbing material may improve the automobile's energy efficiency. For example, with improved thermal resistance, the automobile's heating and cooling system, defroster/defogger, fan/blower, and/or ventilation system may use less energy (e.g., to maintain a desired temperature and/or humidity inside the automobile). Such improved energy efficiency may be desirable for an electric vehicle. For example, an electric vehicle that includes the disclosed sound-absorbing material on one or more interior surfaces may achieve more mileage per kilowatt hour (kWh).

The disclosed sound-absorbing material may have a thickness that is desirable for absorbing and/or blocking sound and/or improving thermal resistance inside an automobile. For example, the sound-absorbing material may have a thickness between about 0.1" and about 0.3". As an example, the sound-absorbing material may have a thickness between about 0.125" and about 0.25". In some embodiments, the sound-absorbing material has a thickness of 0.205".

In several embodiments, the disclosed sound-absorbing material may be coupled with one or more other acoustical materials to enhance acoustics and/or thermal resistance inside of an automobile. As an example, the disclosed sound-absorbing material may be coupled with a damping material. The damping material may reduce noise external to the automobile. The damping material may be coupled to one or more automobile interior surfaces. The damping material may control and lower the resonant frequency of the surface it is coupled to, thereby reducing noise created by vibration of the surface (e.g., road surface noise). For example, the damping material may restrain or stop noise-causing vibration by dissipating or using up the energy causing such vibrations. In several embodiments, the damping material includes butyl rubber and/or asphalt. In one embodiment, the damping material is Dynamat. It is contemplated that the one or more other acoustical materials coupled to or laminated/coated onto the sound-absorbing material (e.g., the damping material) may include one or more of polyester, polypropylene, viscose, woodpulp, cellulose, bamboo, cotton, spunlace, spunbond, chembond, and wetlaid. The one or more other acoustical materials (e.g., the damping material) may be coupled to, laminated onto, or coated onto the sound-absorbing material.

In several embodiments, the damping material is coupled to an interior automobile surface. For example, the damping material may have an adhesive surface that couples to the interior automobile surface; however, other conventional means of coupling material to a surface are contemplated. The damping material may be molded to conform to the interior automobile surface. For example, the damping material may be heated before coupling it to the interior automobile surface. The damping material may be coupled to a plurality of or all interior surfaces of the automobile, including, for example, the floor, ceiling or headliner, door panels, trunk surfaces, hood surfaces, and the like. By coupling the damping material to the interior automobile surfaces, the damping material can control and lower the resonant frequency of the surfaces, thereby reducing noise inside the automobile.

In several embodiments, the sound-absorbing material is coupled to the damping material. For example, the backing may be coupled to the damping material. For example, the backing may have an adhesive surface that couples to the damping material; however, other conventional means of coupling material to a surface are contemplated. The sound-absorbing material may be molded to conform to the interior automobile surface to which the damping material is coupled to. For example, the sound-absorbing material may be heated before coupling it to the damping material. The absorptive surface may face one or more sources of sound in the interior of the automobile or the interior of a compartment or enclosure of the automobile, such as, for example, the interior of a speaker compartment. By coupling the sound-absorbing material in this manner, the absorptive surface can absorb sound inside the automobile, thereby reducing noise inside the automobile. In embodiments where the damping material is omitted, the sound-absorbing material is coupled to the interior automobile surface in a similar manner. For example, the sound-absorbing material may be coupled to a surface of a speaker compartment.

In some embodiments, the sound-absorbing material is coupled with a second sound-absorbing material. For example, the backing of the sound-absorbing material may be coupled to the second sound-absorbing material. The sound-absorbing material may absorb sound waves of a certain frequency or frequency range. For example, the sound-absorbing material may absorb medium to high frequency sound waves. In some embodiments, the sound-absorbing material may absorb certain low frequency sound waves. The second sound-absorbing material may absorb sound wave frequencies that overlap with and/or are outside of the frequency range absorbed by the sound-absorbing material. For example, the second sound-absorbing material may absorb low frequency sound waves. In embodiments where the sound-absorbing material absorbs certain low frequency sound waves, the second sound-absorbing material may enhance the level or amount of low frequency sound wave absorption. In this manner, a majority of or all sound waves may be absorbed when the materials are combined. When these materials are placed in combination adjacent to a speaker, echo and back wave frequency cancellation is mitigated or eliminated by their absorption of sound waves emitted from the rear of the speaker and by their blocking of sound waves from escaping the enclosure or interior. It is contemplated that the second sound-absorbing material and the damping material described herein may be the same material (e.g., butyl rubber or asphalt).

In several embodiments, the sound-absorbing material and damping material, when combined, improve the acoustics inside of an automobile. By arranging the materials such that the damping material is coupled to an automobile interior surface and the sound-absorbing material is coupled to the damping material with the absorptive surface facing an interior of the automobile or an automobile compartment, sounds inside and outside the automobile are reduced or deadened, thereby producing improved sound quality inside of the automobile. By placing the sound-absorbing material adjacent to the automobile speaker or speakers, improved sound quality may be observed as echo and back wave cancellation or interference is mitigated or eliminated.

Figure 1B:
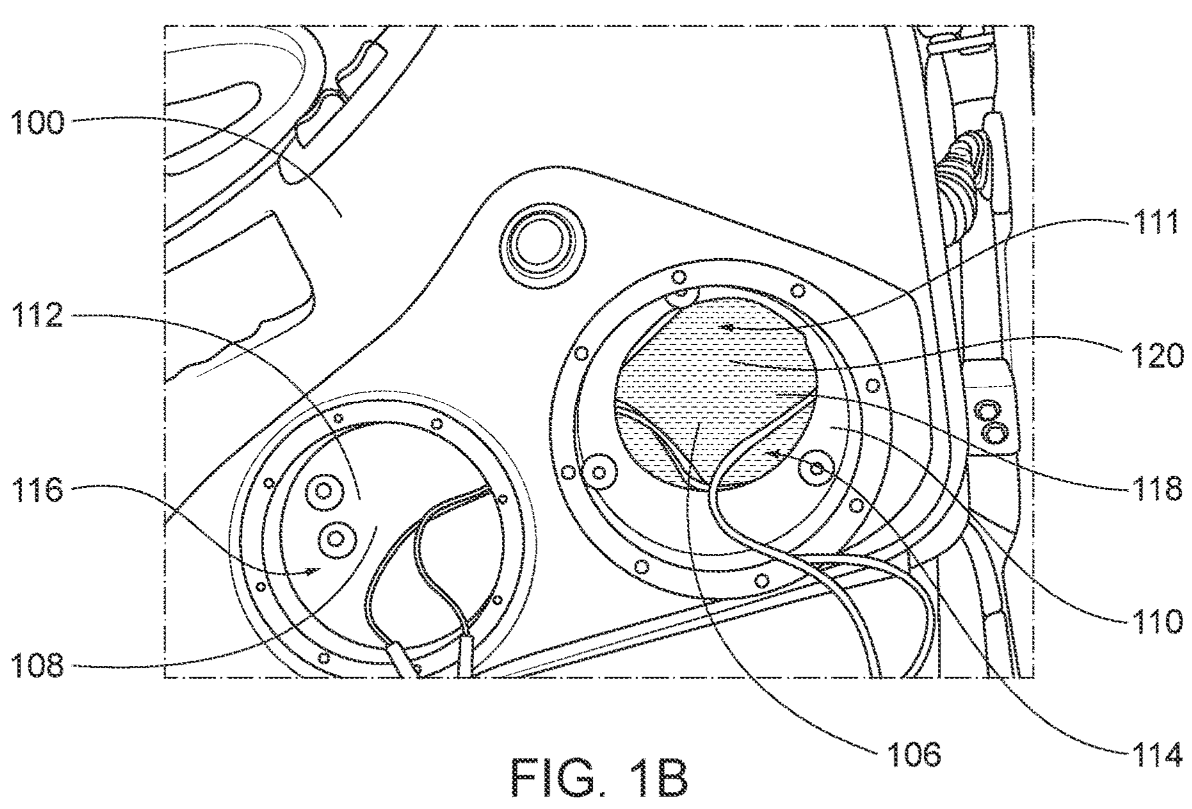
FIG. 1B is a front view of the automobile door of FIG. 1A with the first and second speakers removed from a first and second speaker compartment, respectively, that incorporate disclosed acoustical material.
Figure 1C:
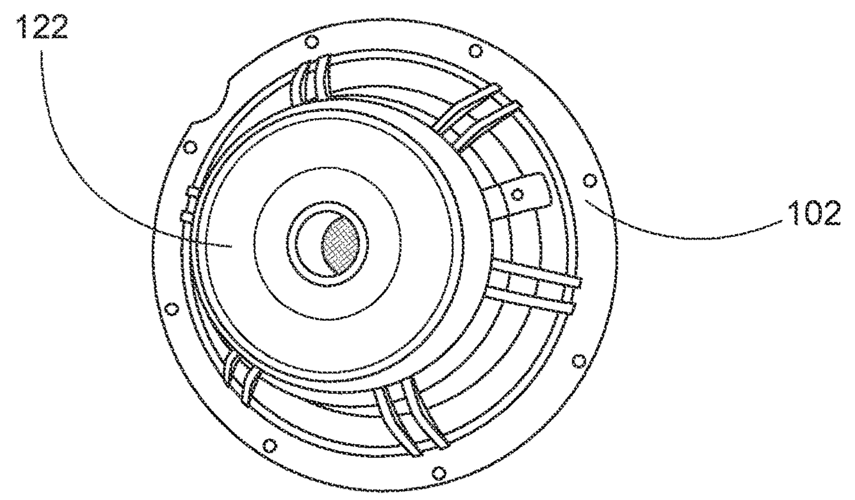
FIG. 1C is a rear view of the first speaker of FIG. 1A removed from the first speaker compartment of FIG. 1B.

Turning now to the figures, various embodiments of an automobile interior with enhanced acoustics and thermal resistance will now be discussed in more detail. The figures depict disclosed sound-absorbing materials with horizontal dashed lines and disclosed damping materials with diagonal dotted lines. FIGS. 1A-C show an embodiment of an automobile interior having a sound-absorbing material described herein positioned in a speaker compartment adjacent to a speaker. FIG. 1A is a front view of an automobile door 100 with a first speaker 102 and a second speaker 104. FIG. 1B is a front view of the automobile door 100 of FIG. 1A with the first and second speakers 102, 104 removed.

As shown in FIGS. 1A-B, the door 100 includes first and second speaker compartments 106, 108. The first and second speaker compartments 106, 108 house the first and second speakers 102, 104, respectively. The first and second speaker compartments 106, 108 include first and second speaker compartment rear walls 110, 112, respectively, and a first speaker compartment cavity 114 and a second speaker compartment cavity 116, respectively. In the depicted embodiment, the first speaker compartment rear wall 110 includes a first speaker compartment aperture 111 and a first door panel wall 118 that is recessed from the first speaker compartment rear wall 110. The first door panel wall 118 includes a layer of sound-absorbing material 120. The sound-absorbing material 120 may include an absorptive surface and a backing, as described above. For example, the sound-absorbing material 120 may include a non-woven polyester fabric with a polyethylene backing. As another example, the sound-absorbing material 120 may include needle punch non-woven polyester fabric. As yet another example, the sound-absorbing material 120 may be MuteX. The sound-absorbing material 120 may absorb sound waves of a particular frequency. As one example, the sound-absorbing material 120 may absorb sound waves of medium to high frequency. A second door panel wall (not shown) may be positioned behind the second speaker compartment rear wall 112 in a similar manner as the first door panel wall 118. The second door panel wall may include a layer of sound-absorbing material 120 in a similar manner as the first door panel wall 118. For example, the second door panel wall may be covered with a layer of MuteX. The first and second speakers 102, 104 may be positioned within the first and second speaker compartments 106, 108 such that they are adjacent to the sound-absorbing material 120.

While FIG. 1B depicts the sound-absorbing material 120 on the first door panel wall 118, it is contemplated that the sound-absorbing material 120 may additionally or separately be positioned on the first speaker compartment rear wall 110. For example, the first speaker compartment aperture 111 may be omitted and the sound-absorbing material 120 may be coupled to the first speaker compartment rear wall 110. It is contemplated that the sound-absorbing material 120 may be coupled to the second speaker compartment rear wall 112. It is further contemplated that the sound-absorbing material 120 may be coupled to a second acoustical material. For example, the sound-absorbing material 120 may be coupled to a second sound-absorbing material and/or a damping material, as described herein. For example, the second acoustical material may be coupled to the first and second speaker compartment rear walls 110, 112 and/or to the first and second door panel walls, and positioned in between the sound-absorbing material 120 and the first and second speaker compartment rear walls 110, 112 and/or the first and second door panel walls.

FIG. 1C is a rear view of the first speaker 102 removed from the first speaker compartment 106. As shown, the first speaker 102 has a speaker rear side 122. The first speaker 102 is positioned inside the first speaker compartment cavity 114 such that the speaker rear side 122 is facing the first speaker compartment rear wall 110 and the first door panel wall portion 118. As discussed, sound waves are emitted out the speaker rear side 122. In the depicted embodiment, the sound waves emitted out the speaker rear side 122 are absorbed by the sound-absorbing material 120 behind the first speaker 102 and then blocked by the backing of the sound-absorbing material from escaping the speaker compartment enclosure, thereby preventing echo and back wave cancellation and improving sound quality of the first speaker 102.

Figure 2:
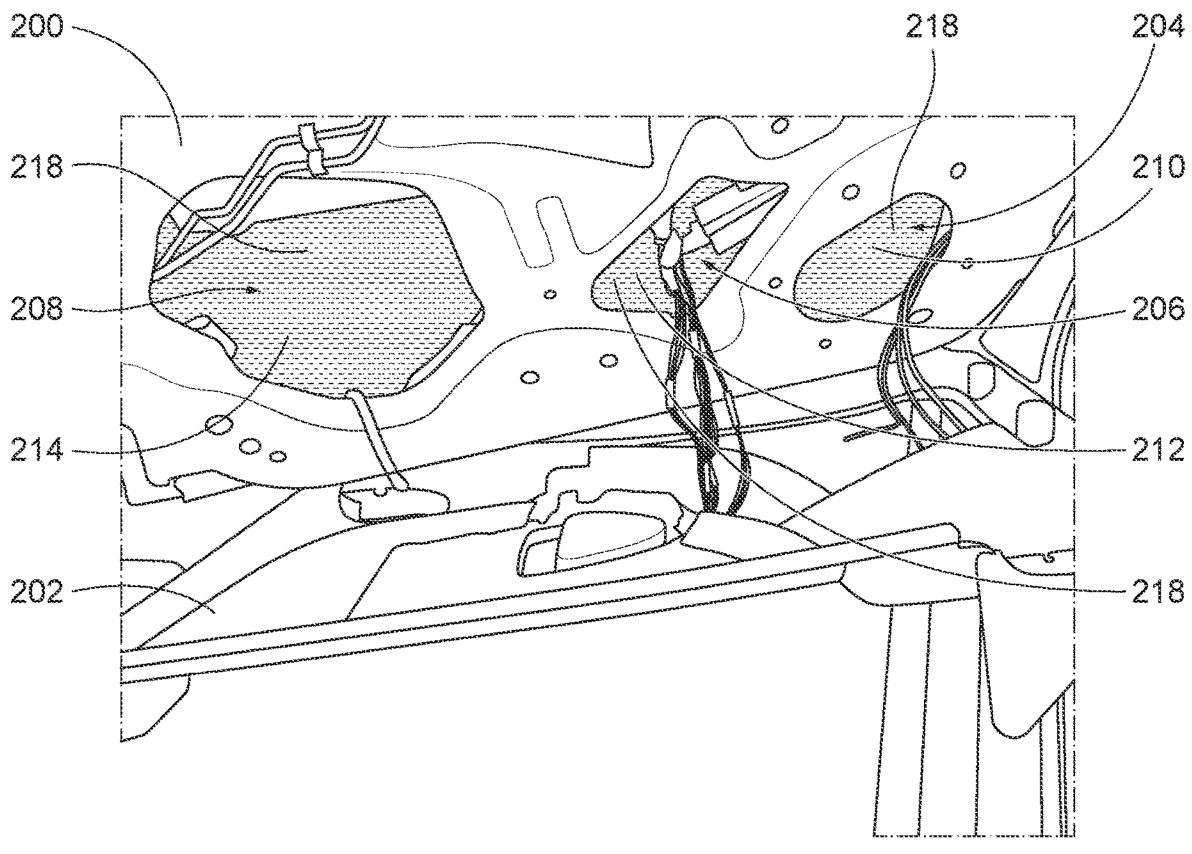
FIG. 2 is an isometric view of a door panel incorporating disclosed acoustical material with the door trim panel removed.
Figure 3:
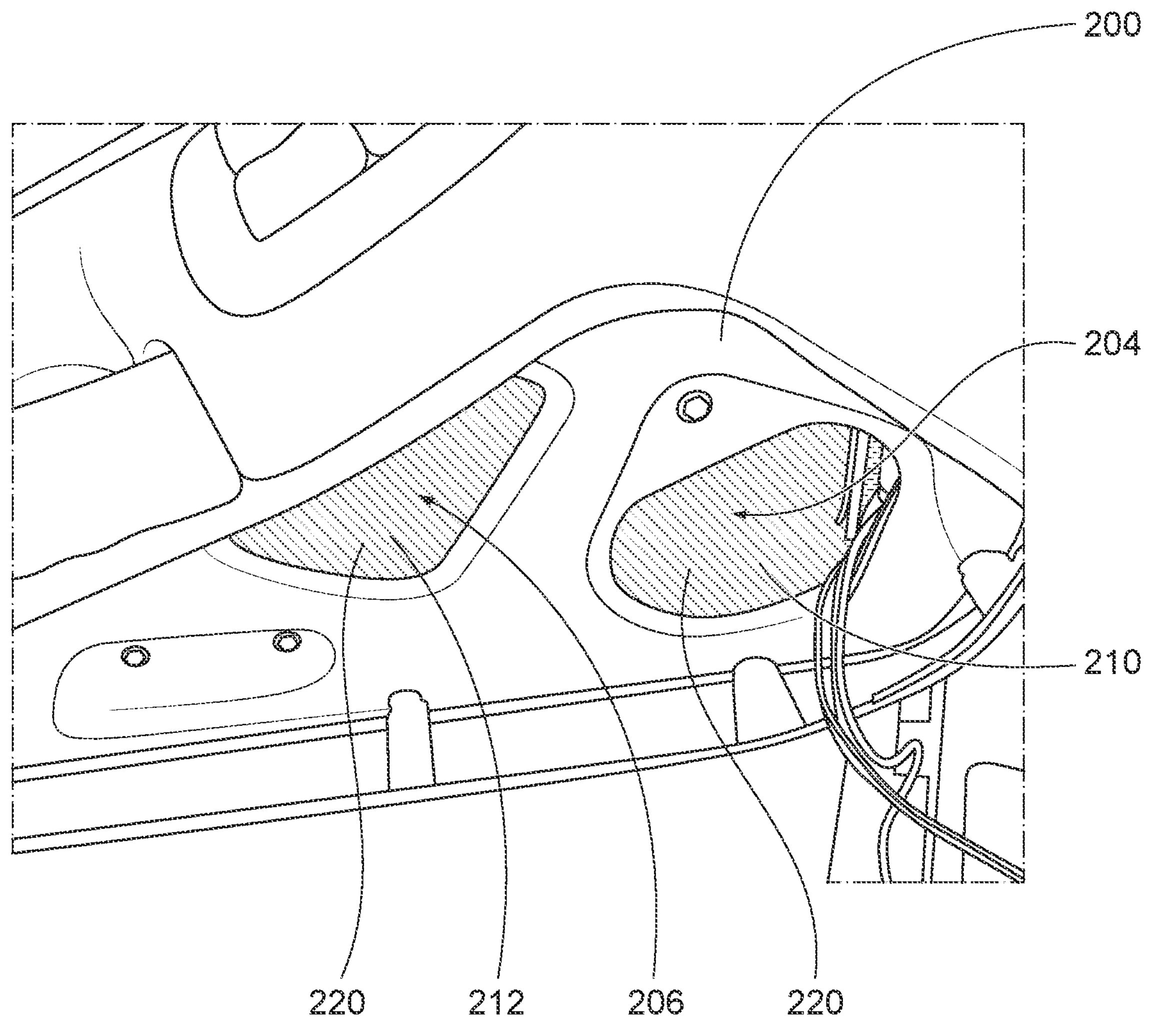
FIG. 3 is a close-up view of first and second speaker compartments of the door panel of FIG. 2 incorporating disclosed acoustical material.
Figure 4:
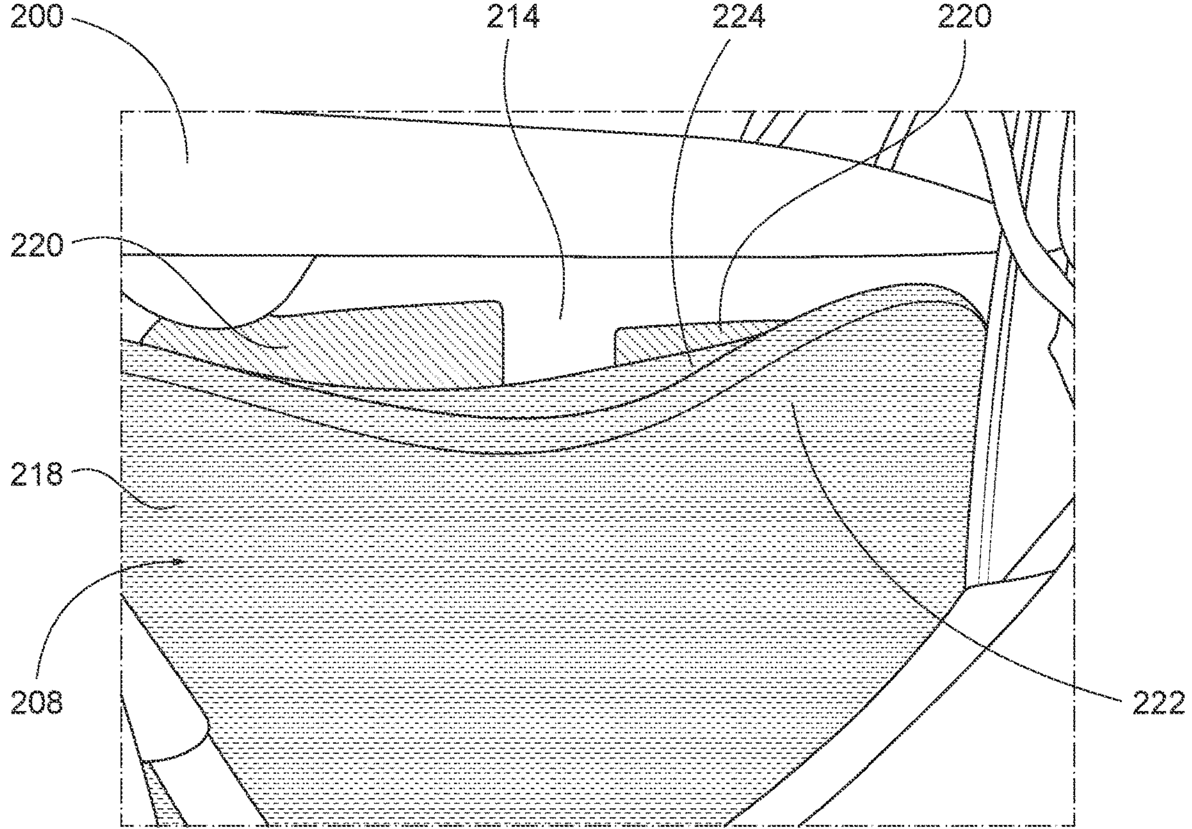
FIG. 4 is a close-up view of a door panel compartment of the door panel of FIG. 2 incorporating disclosed acoustical material.

FIGS. 2-4 show an embodiment in which the sound-absorbing material described herein is positioned in a door panel, including the speaker compartments of the door panel. FIG. 2 is an isometric view of a door panel 200 with the door trim panel 202 removed. As shown, the door panel 200 includes a first speaker compartment 204, a second speaker compartment 206, and a door panel compartment 208. FIG. 3 is a close-up view of the first and second speaker compartments 204, 206 with the sound-absorbing material removed. FIG. 4 is a close-up view of the door panel compartment 208 with the sound-absorbing material peeled back.

As shown in FIGS. 2 and 3, the first speaker compartment 204 includes a first speaker compartment rear wall 210 and the second speaker compartment 206 includes a second speaker compartment rear wall 212. As shown in FIGS. 2 and 4, the door panel compartment 208 includes a door panel compartment rear wall 214. In the depicted embodiment of FIGS. 2-4, a sound-absorbing material 218 is coupled to the first speaker compartment rear wall 210, the second speaker compartment rear wall 212, and the door panel compartment rear wall 214. The sound-absorbing material 218 may cover the surfaces of the first speaker compartment rear wall 210, the second speaker compartment rear wall 212, and the door panel compartment rear wall 214.

In the depicted embodiment, the sound-absorbing material 218 is combined with a damping material 220 inside the first and second speaker compartments 204, 206 and the door panel 200. FIG. 3 shows a close-up view of the first and second speaker compartments 204, 206 with the sound-absorbing material 218 removed, showing the damping material 220 that is positioned between the sound-absorbing material 218 and the first and second speaker compartment rear walls 210, 212. As shown, the damping material 220 is coupled to the first and second speaker compartment rear walls 210, 212. The damping material 220 may cover the surfaces of the first speaker compartment rear wall 210, the second speaker compartment rear wall 212, and the door panel compartment rear wall 214.

FIG. 4 shows a close-up view of the door panel compartment 208 with the sound-absorbing material 218 peeled back, revealing the damping material 220 underneath. As shown, the damping material 220 is coupled to the door panel compartment rear wall 214 inside the door panel compartment 208. The sound-absorbing material 218 is coupled to the damping material 220, as described herein, such that the damping material 220 is positioned between the sound-absorbing material 218 and the door panel compartment rear wall 214.

As shown in FIG. 4, the sound-absorbing material 218 has an absorptive surface 222 and a backing 224. The absorptive surface 222 faces towards an interior of the automobile. The absorptive surface 222 may be made of polyester, such as, for example, non-woven polyester or polyethylene terephthalate (PET). As an example, the absorptive surface may be made of a needle punch non-woven polyester. The backing 224 is coupled to the damping material 220. The backing 224 may be made of a rigid or semi-rigid material. As an example, the backing 224 may be made of polyethylene. In one embodiment, the sound-absorbing material 218 is MuteX. The damping material 220 may include butyl rubber and/or asphalt. For example, the damping material 220 may be Dynamat. It is contemplated that the damping material 220 may have sound-absorbing properties. As an example, the damping material 220 may absorb sound waves having a frequency or frequencies that partially overlap with and/or are outside the frequency range of sound absorbed by the sound-absorbing material 218. As an example, the sound-absorbing material 218 may absorb medium to high frequency sound waves and the damping material 220 may absorb low frequency sound waves. It is also contemplated that both the sound-absorbing material 218 and the damping material 220 may absorb low frequency sound waves. For example, the damping material 220 may improve the level or amount of absorption of low frequency sound waves in embodiments where the sound-absorbing material 218 is limited in its ability to absorb low frequency sound waves.

In some embodiments, the damping material 220 may be omitted from one or more of the first speaker compartment 204, the second speaker compartment 206, and the door panel compartment 208. For example, the sound-absorbing material 218 may be directly coupled to one or more of the first speaker compartment rear wall 210, the second speaker compartment rear wall 212, and the door panel compartment rear wall 214.

Figure 5:
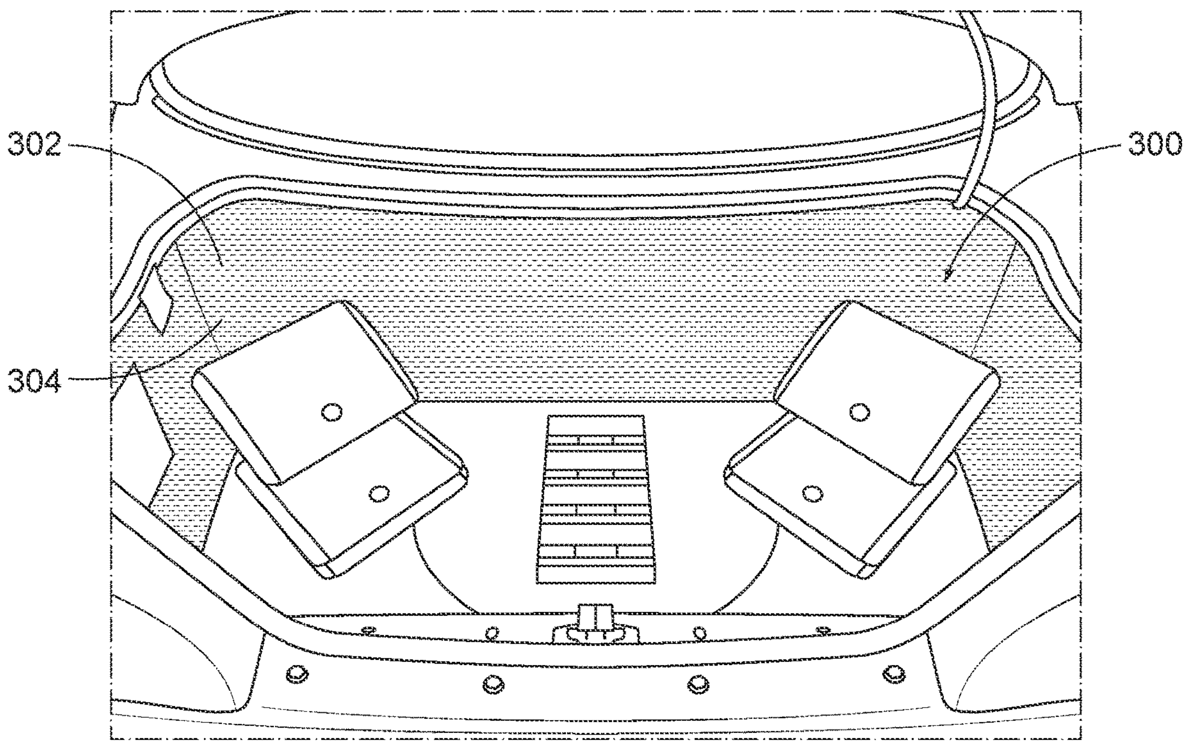
FIG. 5 is a top isometric view of an automobile trunk incorporating disclosed acoustical material.

FIGS. 5-9 depict embodiments of other exemplary areas of an automobile where the sound-absorbing material described herein may be positioned to further enhance the acoustics of the automobile (with or without the damping material described herein or another acoustical material). FIG. 5 is a top isometric view of an automobile trunk 300 incorporating disclosed acoustical material. As shown, the trunk 300 has trunk sidewalls 302 that wrap around an outer edge of the trunk 300. A sound-absorbing material 304 described herein is coupled to the trunk sidewalls 302. As shown, the sound-absorbing material 304 covers the surface of the trunk sidewalls 302. It is contemplated that a damping material described herein may be coupled to the trunk sidewalls 302 and positioned in between the sound-absorbing material 304 and the trunk sidewalls 302 to enhance acoustics.

Figure 6:
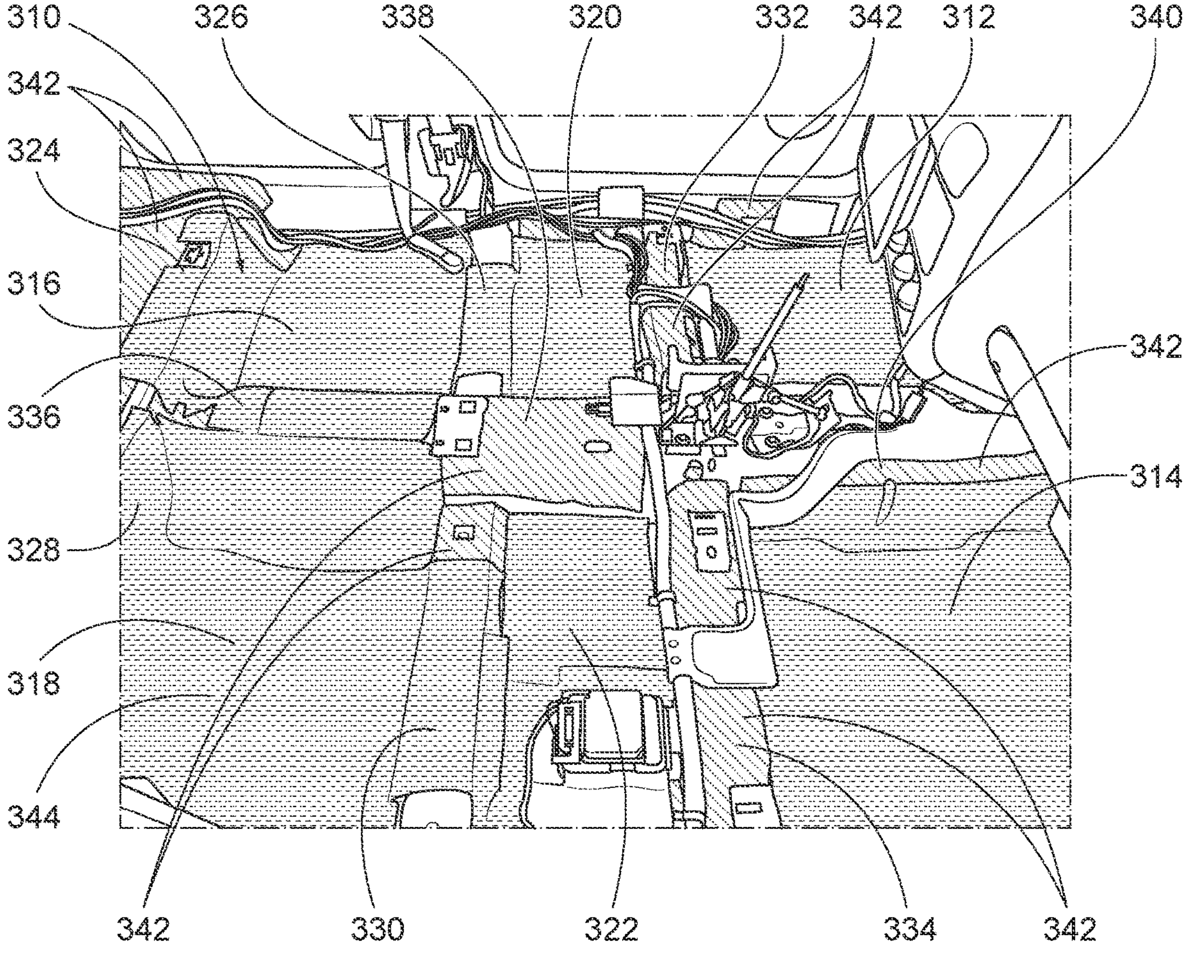
FIG. 6 is a top isometric view of an automobile floorboard or floor pan incorporating disclosed acoustical material.

FIG. 6 is a top isometric view of an automobile floorboard or floor pan 310 incorporating disclosed acoustical material. As shown, the floorboard 310 includes a plurality of surfaces, including left and right front seat floor surfaces 312, 314 and left and right back seat floor surfaces 316, 318. The floorboard 310 further includes a left central floor surface 320, positioned between the left front seat floor surface 312 and the left back seat floor surface 316, and a right central floor surface 322, positioned between the right front seat floor surface 314 and the right back seat floor surface 318. The left back seat floor surface 316 is positioned between a first left floor subframe 324 and a second left floor subframe 326. The right back seat floor surface 318 is positioned between a first right floor subframe 328 and a second right floor subframe 330. The left central floor surface 320 is positioned between the second left floor subframe 326 and a third left floor subframe 332. The right central floor surface 322 is positioned between the second right floor subframe 330 and a third right floor subframe 334. A first central floor subframe 336 is positioned between the left back seat floor surface 316 and the right back seat floor surface 318. A second central floor subframe 338 is positioned between the left central floor surface 320 and the right central floor surface 322. A third central floor subframe 340 is positioned between the left front seat floor surface 312 and the right front seat floor surface 314.

In the depicted embodiment, a damping material 342 described herein is coupled to the floor surfaces 312, 314, 316, 318, 320, 322 and the floor subframes 324, 326, 328, 330, 332, 334, 336, 338, 340. A sound-absorbing material 344 described herein is coupled to the damping material 342 and the floor surfaces 312, 314, 316, 318, 320, 322 and floor subframes 324, 326, 328, 330, 336, 340. The arrangement of the damping material 342 and sound-absorbing material 344 on the automobile floor surfaces and subframes is exemplary and other arrangements and placements are contemplated. The sound-absorbing material 344 may be positioned on one or more of the floor surfaces 312, 314, 316, 318, 320, 322 and the floor subframes 324, 326, 328, 330, 332, 334, 336, 338, 340. The damping material 342 may be positioned on one or more of the floor surfaces 312, 314, 316, 318, 320, 322 and the floor subframes 324, 326, 328, 330, 332, 334, 336, 338, 340. It is contemplated that the damping material 342 may be omitted. The sound-absorbing material 344 and/or damping material 342 may be coupled to a majority of the plurality of surfaces of the floorboard 310.

Figure 7:
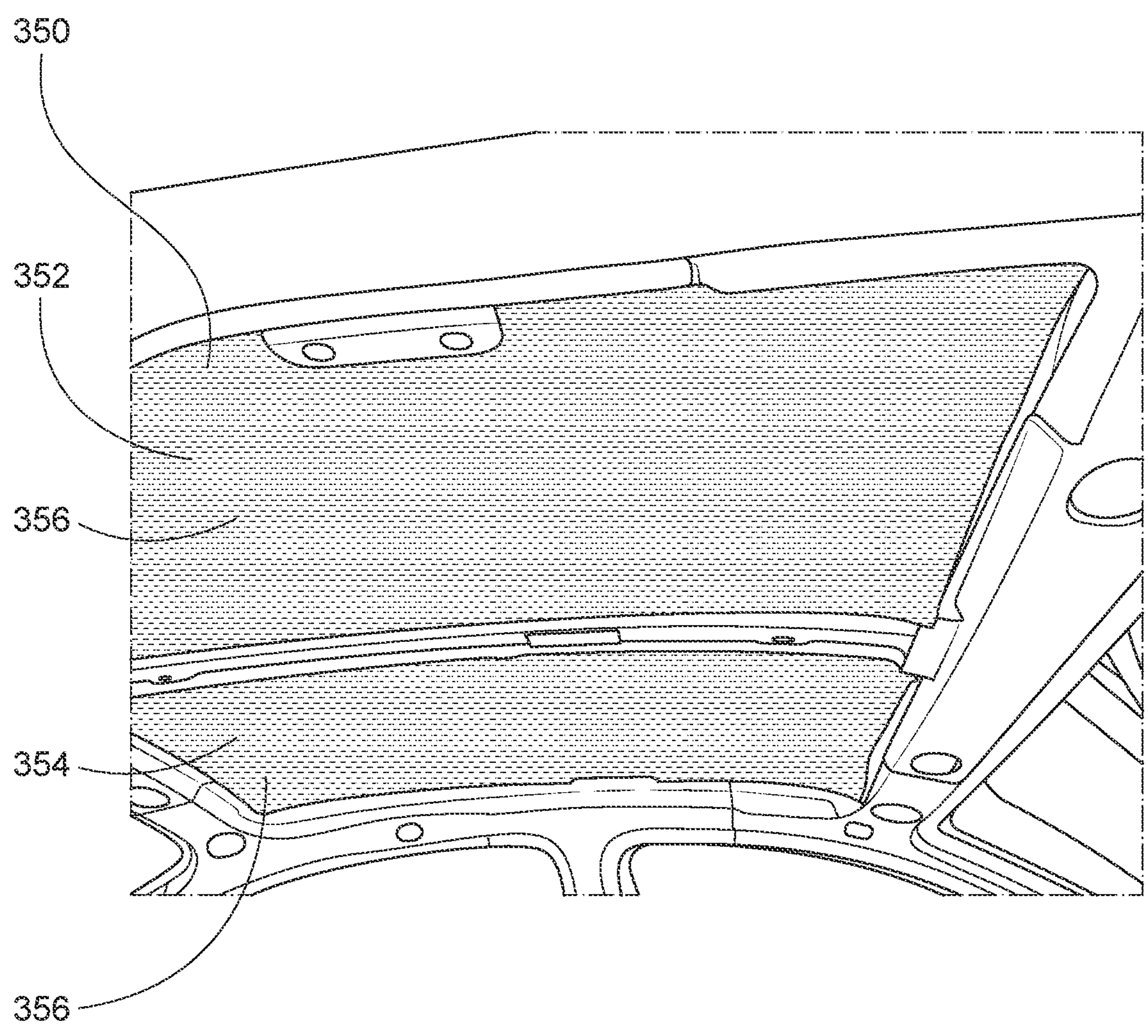
FIG. 7 is a bottom isometric view of an automobile ceiling incorporating disclosed acoustical material.

FIG. 7 is a bottom isometric view of an automobile ceiling 350 incorporating disclosed acoustical material. As shown, the ceiling 350 has a first ceiling surface 352 and a second ceiling surface 354. A sound-absorbing material 356 described herein is coupled to the first and second ceiling surfaces 352, 354. The sound-absorbing material 356 may be positioned between the first and second ceiling surfaces 352, 354 and a headliner. It is contemplated that a damping material described herein may be coupled to the first and second ceiling surfaces 352, 354 and positioned between the sound-absorbing material 356 and the first and second ceiling surfaces 352, 354.

Figure 8:
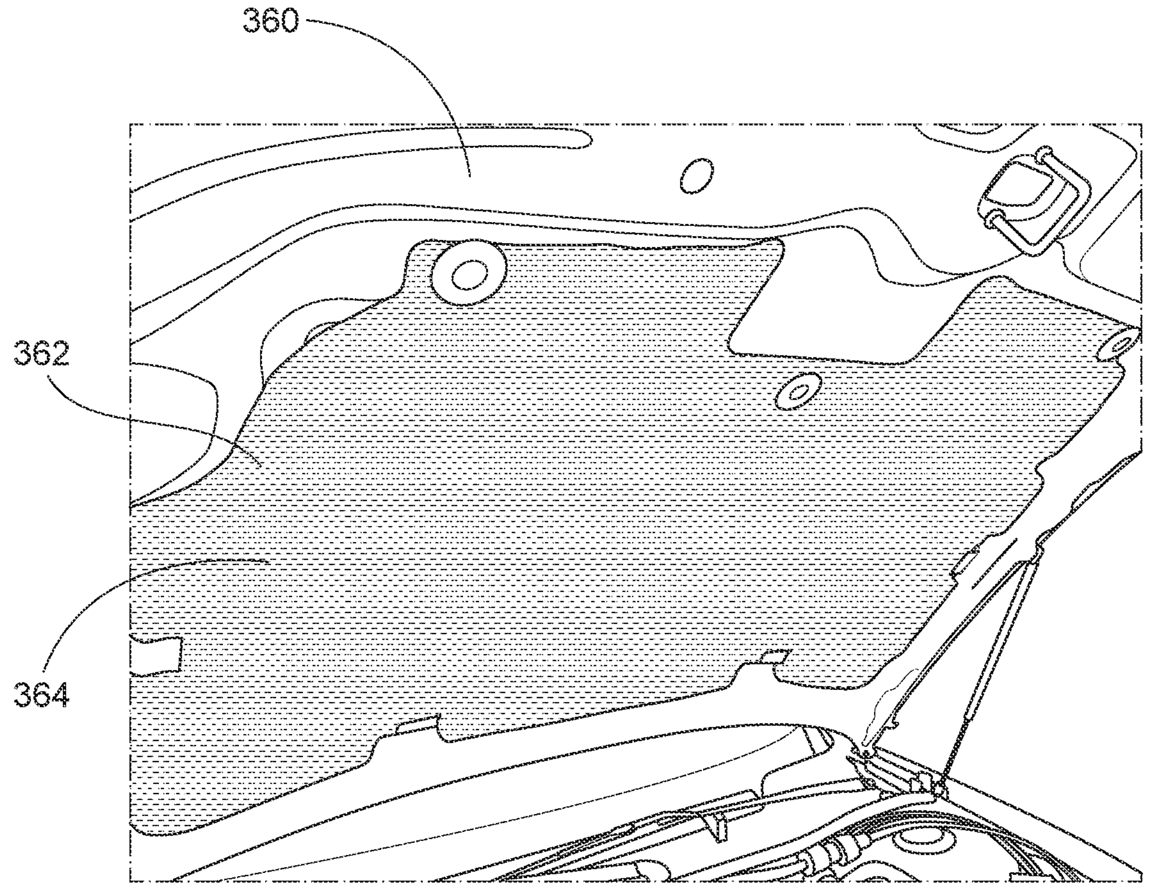
FIG. 8 is an isometric view of an automobile hood incorporating disclosed acoustical material.

FIG. 8 is an isometric view of an automobile hood 360 incorporating disclosed acoustical material. As shown, the hood 360 has a hood surface 362 positioned underneath the hood 360. A sound-absorbing material 364 described herein is coupled to the hood surface 362. It is contemplated that a damping material described herein may be coupled to the hood surface 362 and positioned between the sound-absorbing material 364 and the hood surface 362. Positioning of the one or more disclosed acoustical materials in the hood 360 may reduce or eliminate engine sounds, thereby improving sound quality inside the automobile.

Figure 9:
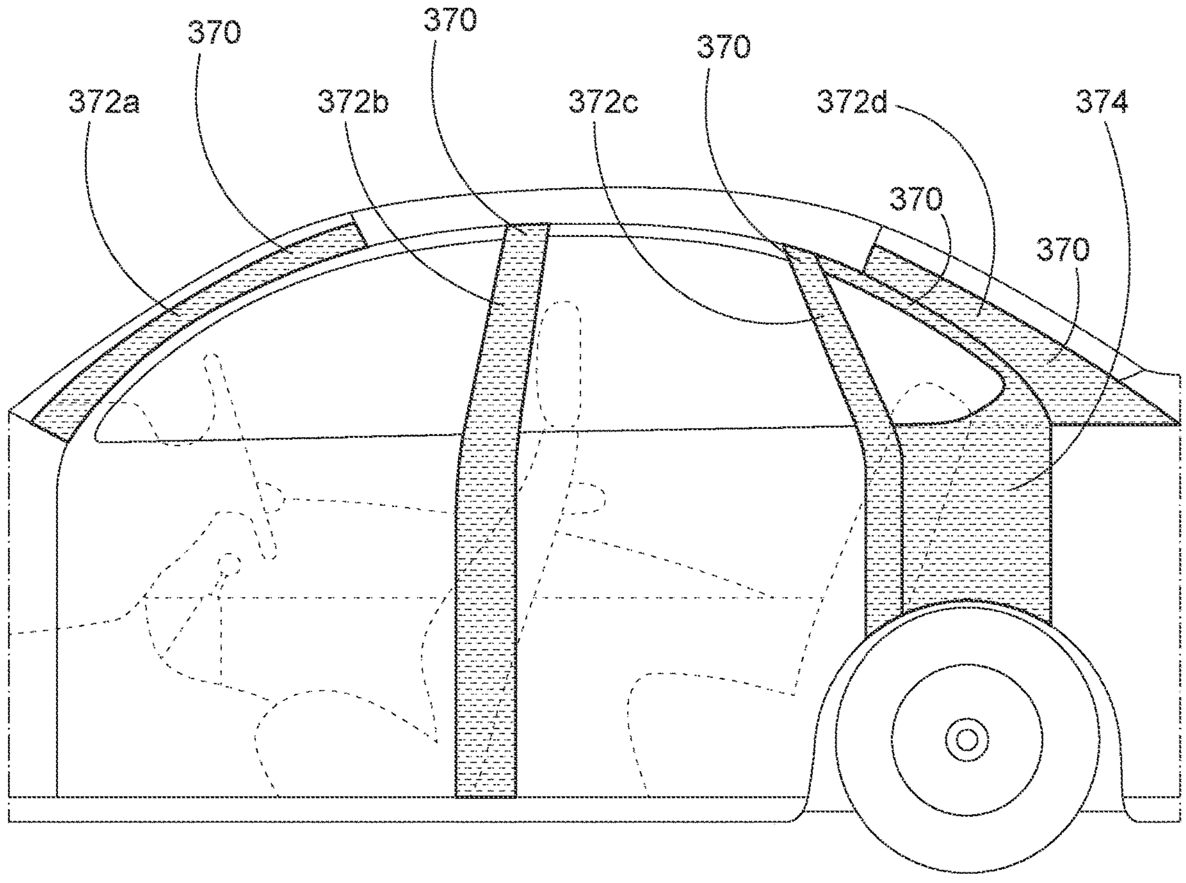
FIG. 9 is a right side view of an automobile with the right side of the automobile removed to show the automobile interior showing left side pillars and panels that incorporate disclosed acoustical material.

FIG. 9 is a right side view of an automobile with the right side of the automobile removed to show the automobile interior showing left side pillars and panels that incorporate disclosed acoustical material. As shown, a sound-absorbing material 370 is coupled to interior surfaces of the A, B, C, and D pillars 372*a,b,c,d*, respectively. The sound-absorbing material 370 is also coupled to the quarter trim panel 374 on an interior surface. As discussed, the sound-absorbing material 370 may absorb sound and improve thermal resistance of the A, B, C, and D pillars 372*a,b,c,d* and quarter trim panel 374. While a single side of the automobile is shown (e.g., the left side), it is contemplated that the mirror image (e.g., the right side) may be the same, with the sound-absorbing material 370 coupled to the opposing (or right) A, B, C, and D pillars and quarter trim panel. It is contemplated that the sound-absorbing material 370 may be omitted from one or more of the A, B, C, and D pillars 372*a,b,c,d* and quarter trim panel 374.

It is contemplated that the sound-absorbing material described herein (coupled to the damping material described herein or with the damping material omitted) may be positioned in one or more of the locations and on one or more of the surfaces described in FIGS. 5-9. FIGS. 5-9 are meant to be exemplary and it is contemplated that the sound-absorbing material described herein (coupled to the damping material described herein or with the damping material omitted) may be positioned in other locations and on other surfaces of an automobile to enhance automobile acoustics. The sound-absorbing material described herein (coupled to the damping material described herein or with the damping material omitted) may be positioned in such other locations of the automobile and on other automobile surfaces in addition to being positioned within the one or more speaker compartments of the door panel, as described with respect to FIGS. 1A-3. For example, the positioning of the sound-absorbing material in the one or more speaker compartments may mitigate echo and back wave cancellation while the positioning of the sound-absorbing material in other locations throughout the automobile may muffle or deaden interior sounds and enhance acoustics and/or thermal resistance. For example, positioning the sound-absorbing material throughout the automobile may minimize reflection of sound waves off the hard automobile interior surfaces, thereby controlling or mitigating echo inside the automobile. Further, positioning the sound-absorbing material throughout the automobile may improve thermal resistance and energy efficiency. The addition of the damping material described herein may muffle or deaden exterior sounds, such as road noise and noise vibrations. In some embodiments, the addition of the damping material may further improve thermal resistance.

Figure 10:
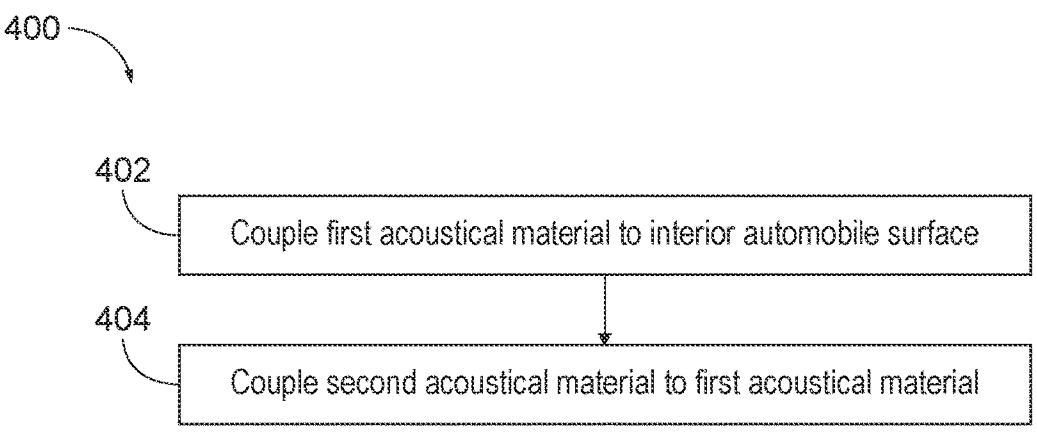
FIG. 10 is a flow chart illustrating a method of improving acoustics and thermal resistance of an automobile.

In several embodiments, methods of improving acoustics in the interior of an automobile are disclosed. FIG. 10 is a flow chart illustrating a method of improving acoustics in an automobile. The method 400 begins with operation 402 and a first acoustical material may be coupled to an interior automobile surface. For example, the first acoustical material may be coupled to an interior automobile surface adjacent to an automobile speaker. The interior automobile surface may be a door panel surface or a surface of a speaker compartment. After operation 402, the method 400 may proceed to operation 404 and a second acoustical material may be coupled to the first acoustical material, such that the first acoustical material is positioned in between the second acoustical material and the interior automobile surface. For example, the second acoustical material may be coupled to the first acoustical material on an interior automobile surface adjacent to an automobile speaker. It is contemplated that the first acoustical material may be omitted and the second acoustical material may be coupled directly to an interior automobile surface, such as, for example, an interior automobile surface adjacent to an automobile speaker (e.g., a door panel surface or a surface of a speaker compartment). The first acoustical material may be a damping material. The damping material may include butyl rubber and/or asphalt. For example, the first acoustical material may be Dynamat. The second acoustical material may be a sound-absorbing material. The sound-absorbing material may be made of a non-woven polyester fabric with a polyethylene backing. For example, the second acoustical material may be MuteX.

The methods may further include coupling the first acoustical material to a plurality of interior automobile surfaces. For example, the first acoustical material may be coupled to a majority of interior automobile surfaces (e.g., as depicted in FIGS. 5-9). The second acoustical material may be coupled to the first acoustical material. For example, the second acoustical material may be coupled to the first acoustical material on a majority of the interior automobile surfaces. It is contemplated that the first acoustical material and/or the second acoustical material may be omitted on one or more of the plurality of interior automobile surfaces.

Figure 11:
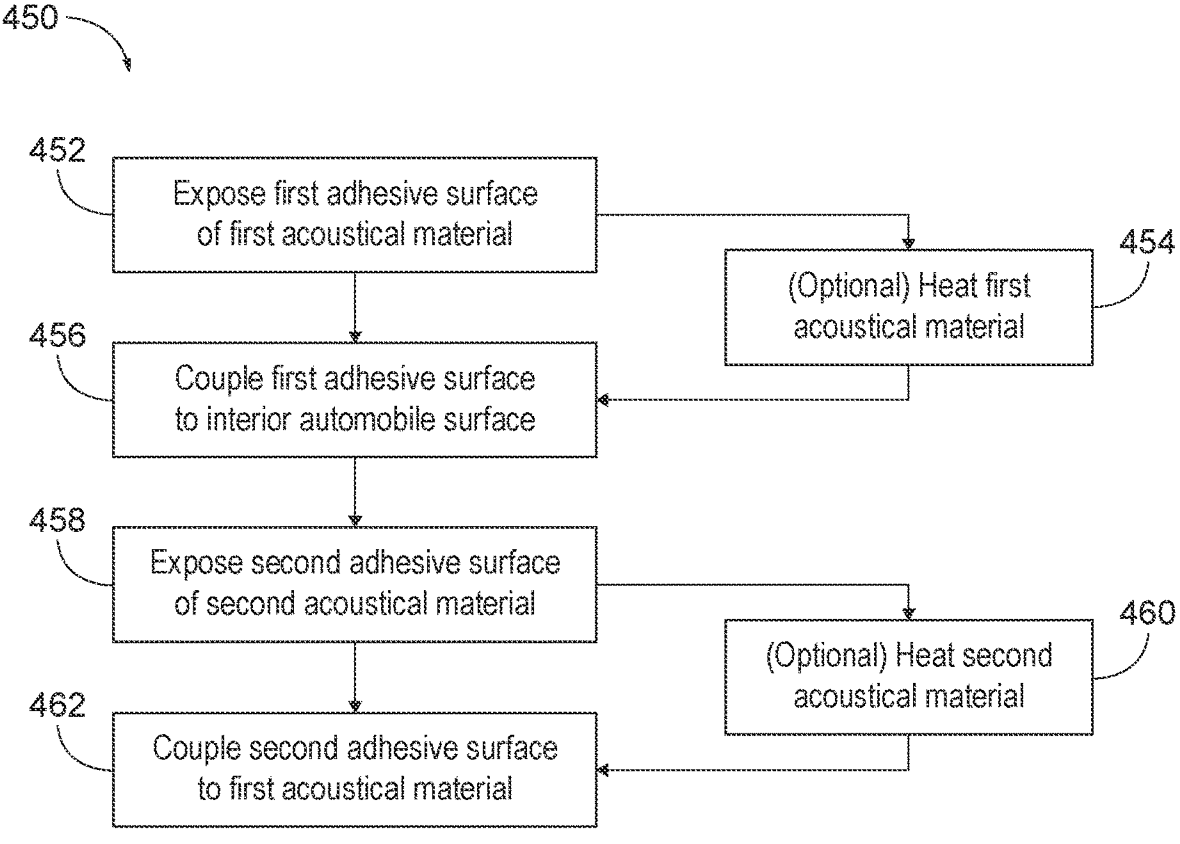
FIG. 11 is a flow chart illustrating a method of coupling acoustical materials to an automobile interior surface.

FIG. 11 is a flow chart illustrating a method of coupling acoustical materials to an automobile interior surface. The method 450 begins with operation 452 and a first adhesive surface of a first acoustical material is exposed. For example, a cover may be removed from the first acoustical material to expose the first acoustical material adhesive surface. After operation 452, the method 450 may optionally proceed to operation 454 and the first acoustical material may be heated. For example, heating the first acoustical material may help to mold and shape the first acoustical material (e.g., when applying it to an automobile interior surface). After operation 452, or optionally operation 454, the method 450 may proceed to operation 456 and the first acoustical material adhesive surface may be coupled to one or more interior automobile surfaces. Coupling the first acoustical material to the one or more interior automobile surfaces may include applying pressure to secure the material to the one or more surfaces.

After operation 456, the method 450 may proceed to operation 458 and a second adhesive surface of a second acoustical material is exposed. For example, a cover may be removed from the second acoustical material to expose the second acoustical material adhesive surface. After operation 458, the method 450 may optionally proceed to operation 460 and the second acoustical material may be heated. For example, heating the second acoustical material may help to mold and shape the second acoustical material (e.g., when applying it to an automobile interior surface).

After operation 458, or optionally operation 460, the method 450 may proceed to operation 462 and the second acoustical material adhesive surface may be coupled to the first acoustical material. Coupling the second acoustical material adhesive surface to the first acoustical material may include applying pressure to secure the second acoustical material to the first acoustical material. It is contemplated that the first acoustical material may be omitted on one or more of the automobile interior surfaces and the second acoustical material coupled directly to the automobile interior surfaces. For example, the first acoustical material may be omitted on the automobile interior surface adjacent to the automobile speaker(s) and the second acoustical material may be coupled directly to the automobile interior surface (e.g., by coupling the second acoustical material adhesive surface to the automobile interior surface).

The first acoustical material may be a damping material, as described above. The damping material may include butyl rubber and/or asphalt. For example, the first acoustical material may be Dynamat. The second acoustical material may be a sound-absorbing material, as described above. The sound-absorbing material may include an absorptive surface and a backing. The backing may include the second adhesive surface. The sound-absorbing material may be made of a needle punch non-woven polyester fabric with a polyethylene backing. For example, the second acoustical material may be MuteX.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

While certain orders of operation are provided for methods disclosed herein, it is contemplated that the operations may be performed in any order and that operations can be omitted, unless specified otherwise.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

We claim:

1. A passive noise cancellation system for an automobile speaker, comprising:

a damping material, wherein the damping material is directly coupled to a surface of a speaker compartment of an automobile;

a sound-absorbing material comprising an absorptive surface and a polyethylene backing, wherein the polyethylene backing is coupled to the damping material;

wherein the sound-absorbing material is positioned adjacent to a rear side of the automobile speaker that is positioned inside the speaker compartment; and wherein the absorptive surface faces towards the rear side of the automobile speaker to absorb sound waves emitted from the rear side of the automobile speaker, and wherein the combination of damping material and sound-absorbing material blocks the sound waves from escaping the speaker compartment and entering into a main cabin of the automobile, thereby attenuating rear speaker sound at its source location and mitigating echo and back wave frequency cancellation in the main cabin created by sound waves emitted from both a front side of the automobile speaker and the rear side of the automobile speaker.

2. The passive noise cancellation system of claim 1, wherein the sound-absorbing material absorbs sound frequencies within a frequency range, and the damping material absorbs sounds frequencies outside the frequency range.

3. The passive noise cancellation system of claim 1, wherein the absorptive surface comprises a needle punch non-woven fabric.

4. The passive noise cancellation system of claim 1, wherein the absorptive surface comprises a non-woven polyester.

5. The passive noise cancellation system of claim 1, wherein the damping material comprises butyl rubber or asphalt.

6. The acoustically enhanced automobile interior of claim 1, wherein the sound-absorbing material has a thermal resistance R-value greater than 3.4.

7. The acoustically enhanced automobile interior of claim 1, wherein the sound-absorbing material has a thickness between 0.1" and 0.3".

8. An automobile interior with enhanced acoustics and thermal resistance, comprising:

a damping material directly coupled to a surface of a speaker compartment of an automobile; and a sound-absorbing material coupled to the damping material;

wherein the sound-absorbing material comprises an absorptive surface comprising a first material and a backing comprising a second material, and wherein the absorptive surface faces towards a rear side of an automobile speaker positioned inside the speaker compartment to block sound waves emitted from the rear side of the automobile speaker from escaping the speaker compartment and entering into a main cabin of the automobile, thereby mitigating echo and back wave frequency cancellation in the main cabin.

9. The automobile interior of claim 8, further comprising:

the damping material coupled to a majority of interior automobile surfaces;

wherein the sound-absorbing material is further coupled to the damping material on the majority of interior automobile surfaces.

10. The automobile interior of claim 9, wherein the absorptive surface comprises a needle punch non-woven polyester, the backing comprises polyethylene, and the damping material comprises butyl rubber or asphalt.

11. The automobile interior of claim 8, wherein the second material is a rigid or semi rigid material and the backing is coupled to the damping material.

12. The automobile interior of claim 8, wherein the second material is polyethylene.

13. The automobile interior of claim 8, wherein the sound-absorbing material has a thermal resistance R-value greater than 3.4.

14. A method of enhancing acoustics in an automobile interior, comprising:

removing a first cover from a damping material to expose a first adhesive surface; and coupling the first adhesive surface directly to a surface of a speaker compartment of an automobile;

removing a second cover from a polyethylene backing of a sound-absorbing material to expose a second adhesive surface; and coupling the second adhesive surface to the damping material, wherein an absorptive surface of the sound-absorbing material is adjacent to a rear side of an automobile speaker and absorbs sound waves emitted from the rear side of the automobile speaker, and wherein the combination of damping material and sound-absorbing material blocks the sound waves from transmitting into a main cabin of the automobile interior, thereby attenuating rear speaker sound at its source location and mitigating echo and back wave frequency cancellation in the main cabin.

15. The method of claim 14, wherein the absorptive surface comprises needle punch non-woven polyester and the damping material comprises butyl rubber.

16. The method of claim 14, further comprising heating the sound-absorbing material prior to coupling the second adhesive surface to the damping material.

17. The method of claim 14, further comprising:

coupling the damping material to a majority of interior automobile surfaces; and coupling the sound-absorbing material to the damping material on the majority of interior automobile surfaces.

* * * * *